June 13, 1939.　　O. E. ROSEN　　2,162,491
TRACER FOR DUPLICATING MACHINES
Filed Dec. 15, 1937　　2 Sheets-Sheet 1
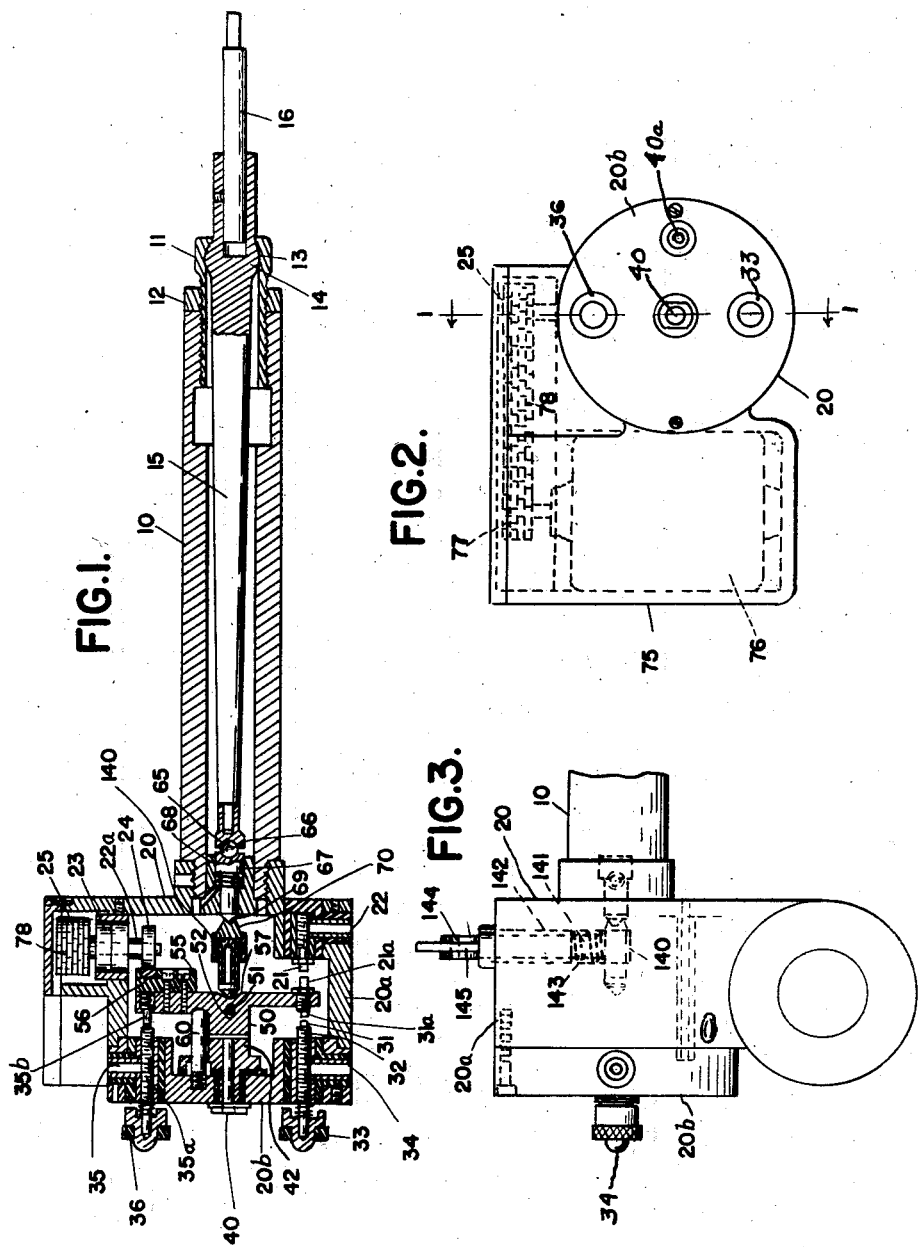
INVENTOR
OSCAR E. ROSEN
BY
ATTORNEYS June 13, 1939.    O. E. ROSEN    2,162,491
TRACER FOR DUPLICATING MACHINES
Filed Dec. 15, 1937    2 Sheets-Sheet 2
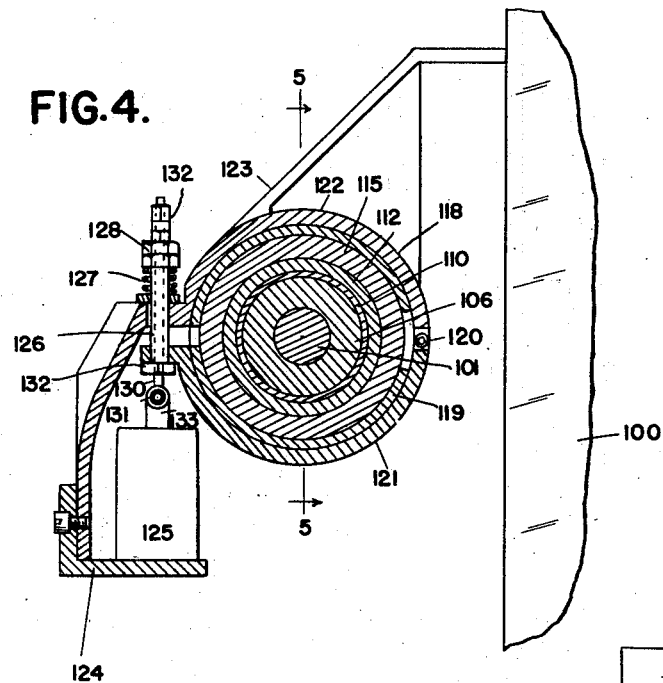
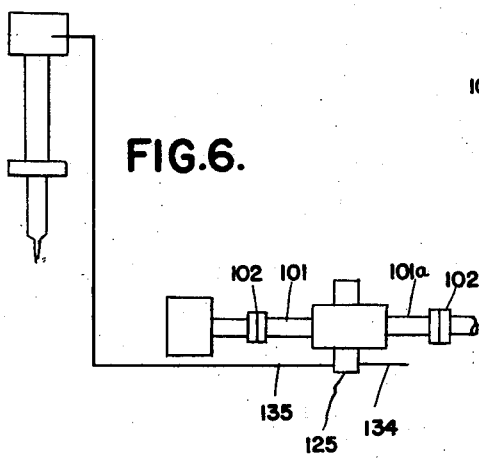
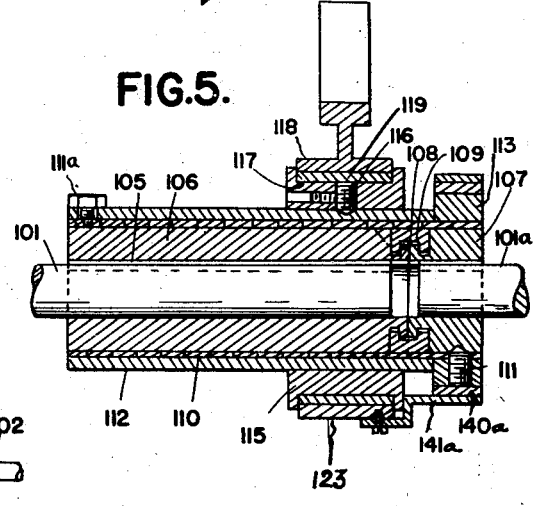
INVENTOR
OSCAR E. ROSEN
BY
ATTORNEYS Patented June 13, 1939

2,162,491

UNITED STATES PATENT OFFICE 2,162,491

TRACER FOR DUPLICATING MACHINES

Oscar E. Rosen, Detroit, Mich.

Application December 15, 1937, Serial No. 179,945

12 Claims. (Cl. 90—62)

The present invention relates to tracers or indicators for use in duplicating machines in which a cutting machine of suitable character is controlled in its operation by suitable means in turn controlled through the action of a pointer or tracer or indicator moved over the object or pattern to be reproduced.

Such duplicating or reproducing machines are shown in my copending applications Serial No. 82,362, filed May 28, 1936, for "Profiling machines"; Serial No. 138,140, filed April 21, 1937, for "Duplicating machines"; and Serial No. 146,252, filed June 3, 1937, for "Tracer for duplicating machines", all such forms being electrically controlled.

Among the objects of the present invention is a tracer which may be utilized for the control of all forms of machines shown in these applications or any other machine of the same general character.

Another object is a tracer which acts to control the movement of the cutting machine, in accordance with the profile of the pattern surface, so as to reproduce such profile without producing any objectionably stepped surface.

Another object is a tracer which itself may be hand-controlled if desired.

Other objects and advantages will readily occur to those skilled in the art upon reference to the following description and the accompanying drawings in which Figure 1 is a longitudinal section on line 1—1 of Figure 2, showing the internal construction of the tracer proper.

Figure 2 is a rear elevation of the tracer.

Figure 3 is a side elevation looking at the underside of Figure 2, with a portion of the tracer omitted.

Figure 4 is a side elevation, with part in section, of the feed control means.

Figure 5 is a section on line 5—5 of Figure 4, and

Figure 6 is a diagrammatic view showing the connection of the tracer to the feed control clutch.

As shown in the drawings, the device comprises a tubular housing 10 having at one end a threaded sleeve 11 fixed in adjusted position by a nut 12. This sleeve is provided in one end with a spherical seat 13 for the ball-shared portion 14 of the tracer finger assembly, the latter consisting of a rear portion 15 which includes the ball 14 and which is axially bored in its forward end to receive the tracer point member 16.

Attached to the rear end of housing 10 is second housing 20, cylindrical in form and somewhat larger in diameter. This housing 20 comprises a main portion 20a attached to housing 10 and a cap portion 20b, these parts being held together by any suitable means. Mounted in the portion 20a and suitably insulated therefrom is a contact member 21 to which is connected a conducting wire (not shown) through the opening 22. Also mounted in portion 20a and extending through one of the side walls thereof at a point diametrically opposite contact 21, is a shaft 22a, suitable bearings 23 being provided. This shaft has mounted eccentrically upon its inner end a small ball bearing 24, the eccentricity being of the order of a few thousandths of an inch, the inner race being fixed to the shaft and the outer race or ring of course turning freely.

The cap portion 20b also carries a contact 31, preferably mounted to be adjustable axially of the housing and in alignment with contact 21. In the structure shown, the contact 31 is carried by a screw 32 passing through the cap and rotatable by means of an insulated knurled knob 33. The screw 32 and contact 31 are of course insulated from the cap and a suitable conductor connected thereto through the inlet 34. A third lead-in for a conductor is indicated at 35, this leading to an adjustable contact carrying screw 35a operable through a suitable insulated head 36. A fourth lead-in for a conductor is shown at 40, this being preferably axially located and insulated from the cap 20b. The lead-in 40 is connected to a block 42 provided with upstanding ears between which is located a lever 50, the latter being pivoted upon a suitable pin 51 and being slotted as shown at 52 for the passage of the pin, thus providing for a small amount of bodily movement of the lever.

As shown in Figure 1, the lever 50 is of sufficient length to extend from the bearing 24 to the contacts 21 and 31, and is itself provided with contacts 21a and 31a which are located between the stationary contacts 21 and 31 and coact therewith in a manner to be described. At the other end, the lever carries a block of insulating material 55 into which is set a button of hardened steel 56 to take the wear of the disc 24, while centrally of the lever is located a conical depression 57.

Also mounted in block 42 is a spring pressed plunger 60 of insulating material which contacts with the lever 50 and tends to thrust the latter axially of the housing away from the cap and therefore against disc 24 and contact 21.

As shown in Figure 1, the inner end 15 of the tracer is provided with a conical depression 65 in which lies a ball 66. The latter is held between this end and the aligned end of a plunger 67 also provided with a conical depression.

This plunger 67 is spring-pressed toward the tracer 15 and is slidably mounted in a short sleeve 68 fixed in the rear end of housing 10 which in turn is fixed into the housing 20.

The plunger 67 extends into housing 20 and has its end conical or more or less pointed as shown at 69 and is received in a corresponding socket in a short extension piece 70, conical at its other end to cooperate with the depression 57 in lever 50, its point angle being slightly less than the angle of the depression.

Further, the extension piece is, as shown, constructed of conducting material and insulating material so arranged that its two ends are insulated from each other.

As shown in Figures 2 and 3, housing 20 is provided with a lateral extension 75 within which is mounted a suitable electric motor 76 provided with a pulley 77 over which and over pulley 25 extends a suitable drive belt 78 and current supply for this motor may be conveniently taken from connector 35 and from block 42, such connections not being shown, the lead wires extending through a suitable opening in the housing 20.

In the operation of the present device as so far described, for example in connection with the machines shown in the copending applications above referred to, suitable conductors will extend from connector 22 to one of the solenoids controlling machine movement in one direction and from connector 34 to the other solenoid. A suitable current supply conductor will extend to connector 40 and thence to lever 50. Further, a suitable conductor will be secured to connector 35 to provide for continuous operation of the motor 76.

With these connections and with the initial adjustment such that the contacts 21 and 21a are together, these will remain together until the tracer finger 16 touches the pattern, either laterally or directly upon the end, the movement of lever 50, due to the action of eccentric 24 being taken in the slotted pivotal mounting and by plunger 60.

However, any axial or lateral movement of the finger 16 will cause the lever 50 to be moved bodily toward the left (Figure 1) and, if such movement is sufficient, the contacts 31 and 31a will come together and cause the opposite movement of the machine.

The device should be so adjusted that the slight oscillating movement of the lever 50 due to the rotating eccentric 24 is insufficient to cause the contacts 21a and 31a to move from one to the other of contacts 21 and 31, to thereby provide for a neutral position of the tracer finger.

In the operation of such cutting machines, however, the pattern sometimes has a contour such that there is an abrupt or vertical rise and, in such cases, means for stopping temporarily the movement of the work laterally of the cutter must be provided. When the tracer 16 strikes such a rise in the contour of the pattern it of course brings contacts 31 and 31a together and causes the desired feed of the work in a direction parallel to the axis of the cutter. However, if the contour is vertical the feed must be stopped from lateral movement to allow the vertical cut. Such means is provided in the present device and is shown in Figures 4, 5 and 6.

In these figures the frame of the cutting machine is indicated at 100 and the shaft operating the work table at 101 and 101a, these being connected through universal joints 102, the one part to the drive and the other to the movable table, this connection being indicated diagrammatically in Figure 6. It should be understood that in the conventional machine a continuous shaft is used while in the present device the two parts 101 and 101a are used in the same manner when connected by the device about to be described.

In the device shown, the shaft portions 101 and 101a are aligned but spaced apart at a short distance, the end of part 101 extending into and keyed as at 105 to a sleeve 106 and the end 101a extending into and being keyed to a short sleeve or collar 107. The sleeves 106 and 107 at their adjacent ends are, as shown, reduced and flanged as at 108 to coact with an internally grooved split collar 109 which preserves the alignment and prevents the separation of the shaft portions.

The two sleeves 106 and 107 are surrounded by a helix 110 which is fixed to collar 107 as by a screw 111 and which extends to the far end of sleeve 106, being fixed at that end as by screw 111a to a close fitting outer sleeve 112 which encloses that portion of the helix overlying sleeve 106 and ring 109. The portion of helix 110 overlying sleeve 107 is covered by a ring 113 which serves to anchor screw 111 and also furnishes a braking surface for this sleeve. The purpose of this latter will appear later.

Surrounding sleeve 112 and fixed thereto by a screw or screws 116 is a brake ring 115, grooved as at 117, and in the groove is located a brake 118 having suitable lining 119.

This brake 118 is as shown, composed of two shoes hinged together as at 120, one shoe 121 being movable with respect to the rest of the device and the other 122 being an integral part of a frame 123, which frame is provided with a projecting upper end adapted to press against one of the walls 100 while the lower end is provided with a foot 124 serving to support and also as a suitable mounting for a solenoid 125.

The free ends of brake shoes 121 and 122 are traversed by a bolt 126 arranged vertically therein and provided with a spring 127 which, acting between nuts 128 and stationary shoe 122, tends to pull the shoes together and thereby maintain application of the brake to the ring 115, suitable spring adjustment is of course accomplished through the movement of the nuts 128.

In the preferred construction, the bolt 126 is bored longitudinally and has a suitable rod 130 extending therethrough, the lower end being provided with an eye 131 and the upper end threaded to receive suitable nuts 132 serving to adjust the position of the rod. The lower end of rod 130 is connected in suitable fashion to the armature 133 of solenoid 125, and the winding of the latter is connected as follows:

The wire 134 from one end of the solenoid winding is connected to the tracer by a suitable binding post or lead in opening 40a, which in turn is connected to one of the supply lines in such manner as to complete a circuit through the solenoid 125 when the contacts 35a and 35b are together.

The wire 135 leads to connection 35 on the tracer and is therefore connected to the contact screw 35a. This contact screw 35a coacts with a contact 35b carried on the same side as the latter so that extreme movement of the tracer finger will not only bring together contacts 31 and 31a, but also contacts 35a and 35b.

Under certain conditions it will be desirable to be able to hand control the contacts 31 and 31a and to maintain these together. Means for such purpose is shown in Figures 1 and 3 to comprise a loose collar 140 around the extension piece 70, which collar 140 is fixed to the end of a plunger 141 slidable in a suitable guide 142 being pressed inwardly as by a spring 143. The outer end of the plunger 141 extends out of the housing 20a, being slotted at its end and carries a short transverse shaft 144 upon which is mounted an eccentric disc 145 of such size and eccentricity as to provide for movement into and out of centralized position of the extension piece 70 when the eccentric is rotated, this acting against the end of the guide 142.

In the operation of the device shown in Figures 4 and 5, it is of course obvious that, when the two shaft parts 101 and 101a are rotating together, the ring 115 is sliding in the brake shoes, but the energization of the solenoid 125 will relieve the pressure of the brake 121—122 upon the ring 115 fixed to one end of the helix 110 and allow the latter to relax its grip upon the sleeve 106, so that the shaft parts are disconnected and part 101 no longer driven. Immediately, however, upon deenergizing the solenoid 125 by breaking the contacts 35a—35b, the brake 121—122 grips and retards the movement of sleeve 112 and causes the helix to clutch the sleeve 106 to recommence the driving of part 101.

In order to insure the continuous contact of the upper end of frame 123 with the wall 100, a small brake 140a acting upon the driven ring 107 may be fixed to frame 123 as by the bracket or brackets 141a. This brake of course will be adjusted to rather slight pressure so that it slips when the other brake is released but tends to carry the frame 123 along with it.

The present case is in part a continuation of application Serial No. 146,252, filed June 3, 1937, for "Tracer for duplicating machines."

What I claim is:

1. In a tracer for electrically controlled duplicating machines, a tracer finger, a pair of electric contacts, a contact carrying arm arranged to complete a circuit through either of said pair and located between them, means for rapidly oscillating said arm in a path shorter than the distance between said pair, and means actuated by said finger for moving said oscillating arm bodily toward one or the other member of said pair whereby rapidly repeated contact is made between said arm and said member.

2. In a tracer for electrically controlled duplicating machines, a tracer finger, a pair of electric contacts oppositely disposed in spaced relation, a contact carrying arm arranged to complete a circuit through either of said pair and located between them, means for rapidly oscillating said arm in a path shorter than the distance between said pair, and means actuated by said finger for moving said oscillating arm bodily toward one or the other member of said pair whereby rapidly repeated contact is made between said arm and said member.

3. In a tracer for electrically controlled duplicating machines, a tracer finger, a pair of electric contacts oppositely disposed in spaced relation, a lever arranged with one arm between said contacts and itself having contacts adapted to coact with the members of the pair, means for rapidly oscillating said lever in a path shorter than the distance between said pair, and means actuated by said finger for moving said oscillating lever bodily toward one or the other member of said pair whereby rapidly repeated contact is made between said lever and said member.

4. In a tracer assembly for electrically controlled duplicator machines, motor means, a contact carrying element rapidly oscillatable by said motor means, a pair of contacts, a tracer finger, and means actuated by said finger for causing said oscillatable element to coact with one or the other of said pair.

5. In a tracer for duplicating machines, a tracer arm fulcrumed for limited universal and longitudinal movement and carrying a tracer finger at one end thereof and having a depression in the other end, a lever transverse to the axis of said arm adjacent said other end and likewise provided with a depression, a ball in said depressions, fulcrum means for said lever in substantially axial alignment with said arm, said fulcrum means constructed and arranged to allow bodily movement of said lever in the direction of the axis of said arm, a pair of stationary contacts, other contacts carried by said lever and arranged to coact with one or the other of the stationary contacts, and means for oscillating said lever whereby repeated coaction between one or the other of said stationary contacts and a lever-carried contact will be had according to the position of said lever.

6. In electrically controlled duplicating cutting machines, a tracer unit including a finger for following the profile of a suitable pattern, electrically operated means for controlling the feed of said machines, said means being controlled by the movement of said tracer by said pattern, said tracer unit including means for rapidly and repeatedly making and breaking circuits to said feed controlling means, and means operated by said finger for modifying the relative length of the circuit making and breaking periods.

7. In a tracer according to claim 1, a third set of contacts so located as to complete a circuit upon extreme lateral movement of the tracer finger.

8. In a tracer according to claim 1, a third set of contacts so located as to complete a circuit upon extreme lateral movement of the tracer finger, one member of said set being carried upon said arm and the other located out of the range of oscillation of said arm.

9. In combination with a tracer adapted to control electrically the operation of a cutting machine having means for driving the work feed table, an electrically actuated clutch for said driving means and means in said tracer for completing an emergency circuit to said clutch means to thereby release said clutch and stop the work feed.

10. A tracer assembly for electrically controlled duplicator machines, said assembly including a tracer finger displaceable with relation to said assembly and adapted to follow the profile of a pattern, a pair of stationary electric contacts in said assembly so arranged that a circuit completed through one of them produces a predetermined operation in the controlled machine and a circuit through the other of said contacts produces another operation on said machine, a circuit making contact adjacent said pair and movable to complete a circuit through one or the other of said pair, means connected to said finger for moving said movable contact toward one or the other of said pair of contacts and means for oscillating said movable contact to and from that one of the stationary contacts nearest to it, whereby to repeatedly make and break the circuit therethrough.

11. A tracer assembly for electrically controlled duplicator machines, said assembly including a tracer finger displaceable with relation to said assembly and adapted to follow the profile of a pattern, an electric contact in said assembly so arranged that a circuit therethrough causes a predetermined operation of said controlled machine, a second contact movable to complete such circuit, means for oscillating one of said contacts toward and from the other and means controlled and actuated by said finger to move one of said contacts toward the other whereby to cause a repeated making and breaking of said circuit, the amount of movement of said movable contact determining the relative duration of said circuit making and breaking periods.

12. A tracer assembly for electrically controlled duplicator machines, said assembly including a tracer finger displaceable with relation to said assembly and adapted to follow the profile of a pattern, means for establishing an electric circuit through said assembly to said controlled machine, means in said assembly for repeatedly making and breaking said circuit, and means actuated by said finger for varying the relative duration of the make and break periods of the thus produced intermittent circuit in proportion to the displacement of said finger.

OSCAR E. ROSEN.